F. A. GRIER.
BRAKE ATTACHMENT FOR TRUCKS.
APPLICATION FILED FEB. 7, 1913.
1,092,989.
Patented Apr. 14, 1914.
2 SHEETS—SHEET 2.
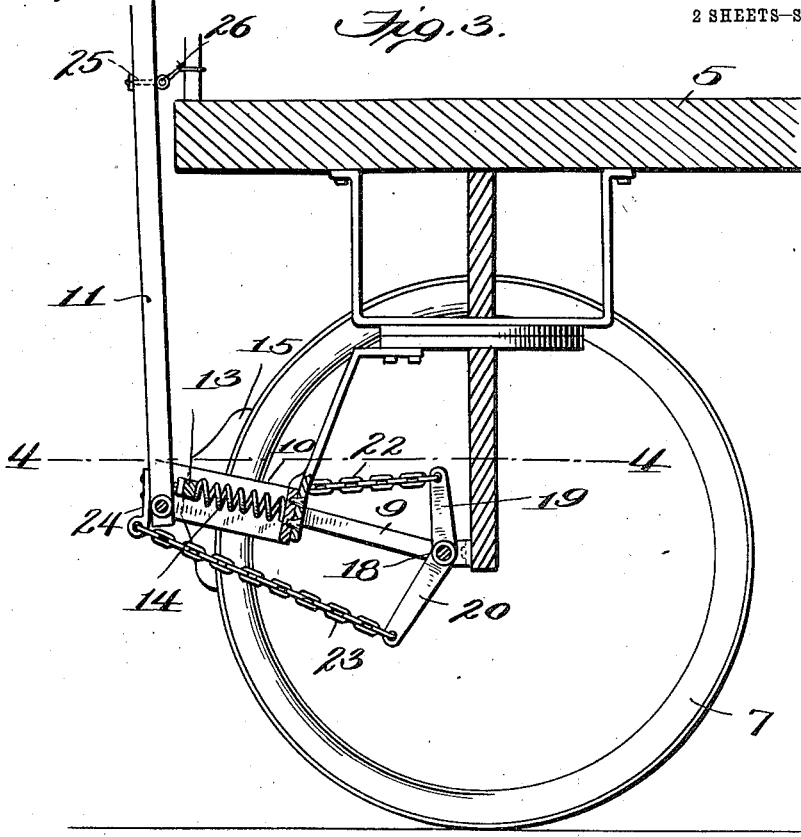
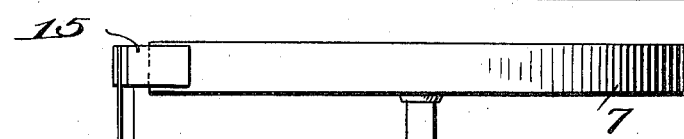
Witnesses:
Chas. S. Hyer
Inventor
Frederick A. Grier
by James L. Norris,
Attorney

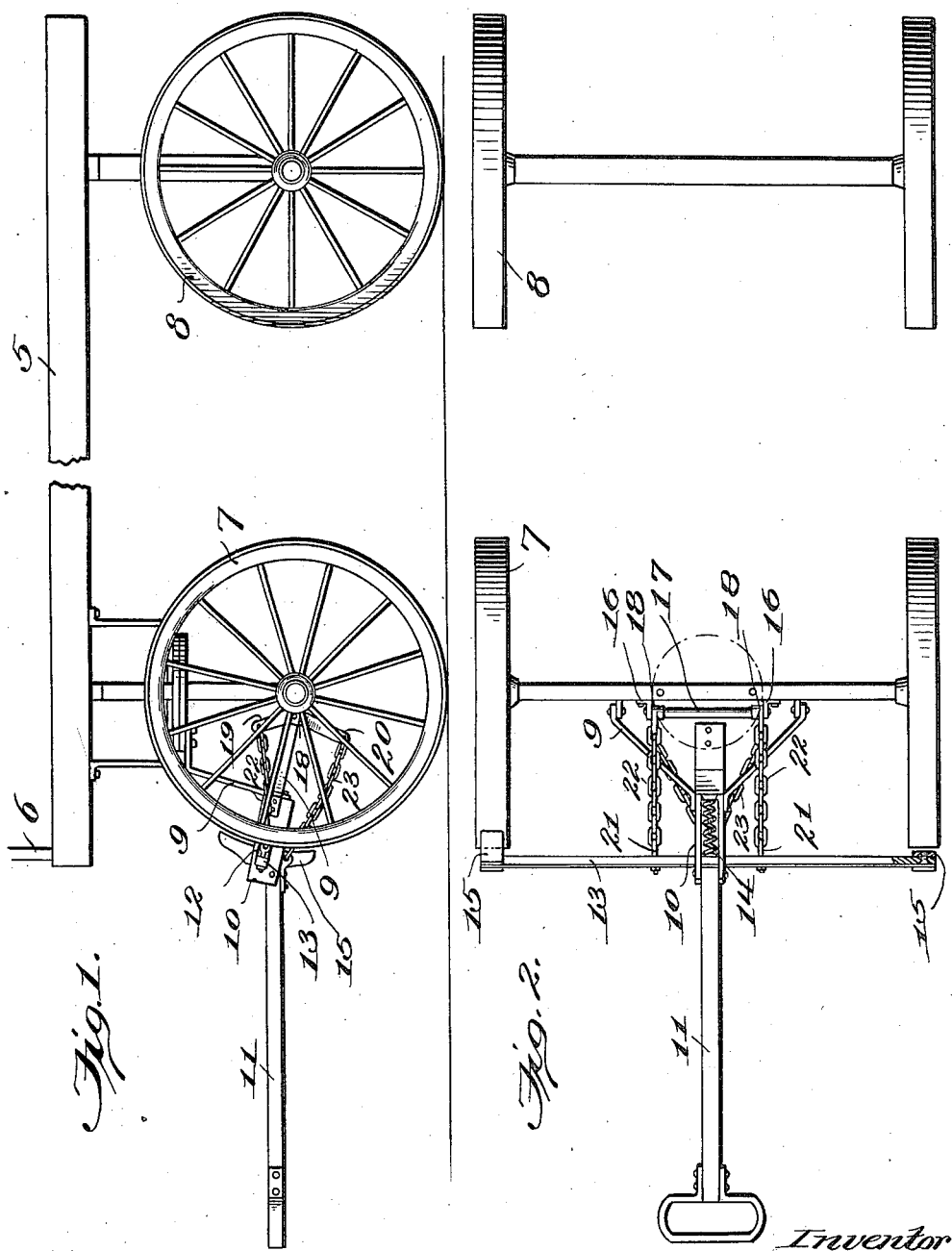

UNITED STATES PATENT OFFICE.

FREDERICK A. GRIER, OF SALISBURY, MARYLAND.

BRAKE ATTACHMENT FOR TRUCKS.

1,092,989.   Specification of Letters Patent.   Patented Apr. 14, 1914.

Application filed February 7, 1913. Serial No. 746,944.

*To all whom it may concern:*

Be it known that I, FREDERICK A. GRIER, a citizen of the United States, residing at Salisbury, in the county of Wicomico and State of Maryland, have invented new and useful Improvements in Brake Attachments for Trucks, of which the following is a specification.

This invention relates to vehicle brakes and particularly that type applicable to baggage trucks, and the primary object of the invention is to provide a baggage or other truck with a particular form of brake device or attachment having shoes adjacent to the front wheels of the truck and controlled, without in the least interfering with the steering operations of the truck, through the medium of the draft tongue which is pivoted so as to move up closely to the front portion of the body of the truck, the brake shoes being applied to the truck wheels when the tongue is pivotally raised or turned upwardly.

The present brake attachment is an improvement on the analogous attachment disclosed in my pending application Serial No. 744,260, filed January 25, 1913, and consists in the construction and arrangement of the several parts which will be more fully hereinafter described and claimed.

In the drawings: Figure 1 is a side elevation of a truck, broken away in part, and embodying the improved brake device or organization, the said brake device or organization being shown in released position relatively to the front wheels of the truck. Fig. 2 is a top plan view of the running gear of the truck with a portion of the brake device or organization shown broken away and a part of the running gear removed, the brake shoes being illustrated out of contact with relation to the front wheels of the truck. Fig. 3 is a longitudinal vertical section of the front portion of a truck showing the draft tongue elevated and illustrating the manner of applying the brake shoes to the front wheels of the truck. Fig. 4 is a horizontal section taken in the plane of the line 4—4, Fig. 3, the front truck wheels being shown in top plan view and one of the said wheels broken away.

The numeral 5 denotes the body or bed of a baggage truck having the usual racks 6 which are ordinarily applied at the front and rear of the truck body and also provided with running gear comprising front and rear axles having thereon pairs of front and rear wheels 7 and 8. The front and rear axles are fixed to the bed or body through the medium of suitable bolsters as in ordinary baggage truck structures, the front axle and wheels 7 being free to be swung under the bed or body either from the right or left; and projecting forwardly from the front axle and the bolster thereof are supporting or connecting braces or rods 9 to which the usual form of metal box, clip or frame 10 is rigidly attached, the tongue 11 being pivoted in the front extremity of the box, clip or frame 10. The said box, clip or frame 10 is formed with a slot 12 extending therethrough, and in this slot a brake bar or beam 13 loosely extends and is engaged at its rear side by the forward extremity of a spring 14 seated in the slot, the upper part of the box being open as shown by Fig. 2 and having the usual construction at its front extremity to receive the pivoted extremity of the handle or draft tongue 11. The spring 14 tends to push the draft bar or beam 13 in a forward direction, and on the opposite ends of said bar or beam, brake shoes 15 are fixed and located adjacent to the front wheels 7. It will therefore be seen that the box, clip or frame 10 is held in fixed position by the braces or rods 9 secured to different portions thereof and that the tongue 11 moves in the forward extremity of said box, clip or frame and is utilized for operating the brake attachment or organization to apply the brake shoes in a manner which will be presently explained. By reason of the spring 14 normally forcing the brake bar or beam 13 in a forward direction, the brake shoes 15 will be held out of contact with relation to the wheels 7, and when the brake shoes are applied they are moved toward the truck wheels 7 against the resistance of the spring 14.

Suitable bearing brackets 16 are secured to the front axle of the truck and therein the opposite extremities of a rock shaft 17 have bearing. On the rock shaft 17 adjacent to the bearing brackets 16 or at any other point that may be desired, bell-crank levers 18 are secured to move with the shaft, each bell-crank lever having an upper short arm 19 and a lower longer arm 20 so that when a pulling tension is exerted on the longer arms 20 the upper arms 19 will be correspondingly thrown or moved to draw the chains 22 taut and immediately affect the brake beam and draw the latter rearwardly together with the brake shoes which contact with the wheels. On opposite sides of the box, clip or frame 10, eye-bolts 21 are adjustably mounted in the brake bar or beam 13, and secured to the said eye-bolts are the forward extremities of chains or analogous devices 22 which extend rearwardly and are attached to the upper ends of the shorter arms 19 of the bell-crank levers 18.

To the lower ends of the longer arms 20 of the bell crank levers 18 the rear ends of chains 23 are attached and are projected forwardly in converging planes and secured to an eye or other analogous device 24 attached to the rear end of the draft tongue 11, as clearly shown by Figs. 3 and 4, and when the said draft tongue is raised or turned upwardly on its pivot as shown by Fig. 3, the chains or analogous devices 23 are drawn taut and exert a pulling tension through the longer arms 20 of the bell-crank levers and the shorter arms 19 of the latter and chains 22 on the draft bar 13. The parts are so proportioned that when the draft tongue is fully turned up adjacent to the front end of the body 5 of the truck, the brake shoes 15 will be fully applied and positively held against the front wheels 7 of the truck. When the draft tongue is raised or elevated to apply the brake shoes to the wheels it may be held up by a suitable securing means, such as an eye-bolt 25 and a hook or catch 26 respectively attached to the draft tongue and the front rack 6 of the truck body 5. When the draft tongue is released and lowered to normal position, the chains 23 are correspondingly slackened and the bell-crank levers are permitted to move in such direction as to slacken the upper chains 22, and in view of the fact that the spring 14 is exerting a tension on the rear portion of the draft bar or beam 13, the latter together with the brake shoes 15 will be moved forwardly the moment the rearward pulling tension on the draft bar or beam is released. The bell-crank levers 18 move uniformly in view of the fact that they are both secured to the rock shaft 17 and consequently the rearward pulling tension through the chains or analogous devices 22 on the draft bar or beam 13 is applied equally on opposite sides of the box, clip or frame 10 and the brake shoes 15 are consequently brought to bear with an even braking contact on the wheels 7.

The improved attachment or braking organization may be readily applied to baggage or other trucks now in use without materially modifying the structure of the trucks, and it will be understood that by operating the braking devices the truck may be brought to a positive standstill at any point desired and the wheels 7 may be turned either right or left or under the body 5 and have the brake shoes applied thereto with the same force and effect as when the wheels are in normal position. The improved braking device or organization will be found exceptionally advantageous in holding the truck in any position desired while loading or unloading the same either adjacent to a car or platform or under any other conditions, and by this means one operator is enabled to readily and positively control the truck as to its movement.

What is claimed is:

1. In a wheeled truck, the combination with the front wheels having a draft tongue pivotally associated therewith and movable upwardly and downwardly, of a rigid brake beam loosely supported adjacent to the rear portion of the tongue and having brake shoes on the ends thereof to engage the front wheels of the truck, means for forcing the brake beam into a normally forward position, flexible devices attached to the brake beam on opposite sides of the center of the latter, bell-crank levers supported by the front running gear of the truck and having upper short arms and lower longer arms, the said flexible devices being attached to the upper short arms of the bell-crank levers, and flexible means attached to the lower longer arms of the bell-crank levers and to the rear end of the tongue.

2. In a wheeled truck, the combination with the front wheels and axle, of a frame rigidly secured to the axle, a tongue pivoted to said frame, a rigid brake beam loosely supported by said frame near the pivoted portion of the tongue and having brake shoes at opposite extremities to engage the front wheels of the truck, flexible means connected to the tongue at opposite sides of the center of the brake beam and also to the axle and operated by the movement of the tongue for applying the brake shoes to the front wheels of the truck, and means disposed in the frame for restoring the brake beam and shoes when released to normal position.

3. In a baggage truck having wheels, the combination with the front wheels and axle of the truck and a pivoted draft tongue associated with the front wheels, of a rigid brake beam mounted adjacent to said pivoted tongue and having brake shoes at opposite ends to engage the said front wheels, and flexible devices and levers respectively connected to the axle and different portions of the draft tongue and operated by the movement of the tongue to apply the shoes to the front wheels of the truck.

4. In a truck having wheels, the combination with the front axle and wheels and a tongue pivotally attached to said axle, of a rigid brake beam loosely supported adjacent to the rear portion of the tongue and having brake shoes at opposite ends to engage the front wheels of the truck, means for moving the brake beam into forward normal position when released, levers attached to the axle, and chains connected to the levers and different portions of the brake beam and the tongue and operated by the latter to draw the said brake beam in a rearward direction and apply the shoes to the front wheels of the truck.

In testimony whereof I have hereunto set my hand in presence of two subscribing witnesses.

FREDERICK A. GRIER.

Witnesses:
E. M. NICHOLS,
DAVID J. MALONE.

Copies of this patent may be obtained for five cents each, by addressing the "Commissioner of Patents, Washington, D. C."